(12) United States Patent
Yamazaki (10) Patent No.: US 9,143,239 B2
(45) Date of Patent: Sep. 22, 2015

(54) SIGNAL PROCESSING DEVICE, SIGNAL PROCESSING METHOD, AND COMMUNICATION DEVICE

(71) Applicant: FUJITSU LIMITED, Kawasaki-shi, Kanagawa (JP)

(72) Inventor: Manabu Yamazaki, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/046,298

(22) Filed: Oct. 4, 2013

(65) Prior Publication Data

US 2014/0193163 A1 Jul. 10, 2014

(30) Foreign Application Priority Data

Jan. 7, 2013 (JP) ................................. 2013-000310

(51) Int. Cl.
*H04B 10/556* (2013.01)
*H04L 27/20* (2006.01)

(52) U.S. Cl.
CPC ........ *H04B 10/5561* (2013.01); *H04L 27/2067* (2013.01)

(58) Field of Classification Search
CPC . H04L 27/20; H04L 27/2042; H04L 27/2053; H04L 27/206; H04L 27/2067
USPC .......... 375/279–281, 308, 329, 332; 329/304, 329/345; 332/103, 144
See application file for complete search history.

(56) References Cited

U.S. PATENT DOCUMENTS

| 4,106,019 | A | * | 8/1978 | Alexander et al. ............ 342/108 |
| 5,291,429 | A | * | 3/1994 | Iwama et al. ................. 708/402 |
| 6,373,859 | B1 | * | 4/2002 | Jedwab et al. ................ 370/479 |
| 2002/0131520 | A1 | * | 9/2002 | Dotsch et al. ................. 375/295 |

FOREIGN PATENT DOCUMENTS

| JP | 3-154458 | 7/1991 |
| JP | 7-50693 | 2/1995 |

* cited by examiner

*Primary Examiner* — Young T Tse
(74) *Attorney, Agent, or Firm* — Staas & Halsey LLP (57) ABSTRACT

A signal processing device includes: a plurality of multipliers configured to obtain a first multiplication result by multiplying a tap coefficient by $1/\sqrt{2}$; a plurality of mappers configured to output a mapping result based on a first mapping coefficient and a digital input signal; and a plurality of first selectors configured to select the first multiplication result based on the mapping result.

19 Claims, 9 Drawing Sheets

| INPUT | | OUTPUT | |
|---|---|---|---|
| BIT 1 | BIT 0 | I | Q |
| 0 | 0 | $+1/\sqrt{2}$ | $+1/\sqrt{2}$ |
| 0 | 1 | $-1/\sqrt{2}$ | $+1/\sqrt{2}$ |
| 1 | 0 | $+1/\sqrt{2}$ | $-1/\sqrt{2}$ |
| 1 | 1 | $-1/\sqrt{2}$ | $-1/\sqrt{2}$ |

SIGNAL PROCESSING DEVICE, SIGNAL PROCESSING METHOD, AND COMMUNICATION DEVICE

CROSS-REFERENCE TO RELATED APPLICATION

This application is based upon and claims the benefit of priority of the prior Japanese Patent Application No. 2013-000310, filed on Jan. 7, 2013, the entire contents of which are incorporated herein by reference.

FIELD

Embodiments discussed herein are related to a signal processing device, a signal processing method, and a communication device.

BACKGROUND

There is a technique to map a two-bit signal to four signal points having a phase different from each other.

A related technique is disclosed in Japanese Laid-open Patent Publication No. 3-154458.

SUMMARY

According to one aspect of the embodiments, a signal processing device includes: a plurality of multipliers configured to obtain a first multiplication result by multiplying a tap coefficient by $1/\sqrt{2}$; a plurality of mappers configured to output a mapping result based on a first mapping coefficient and a digital input signal; and a plurality of first selectors configured to select the first multiplication result based on the mapping result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a QPSK modulation scheme, a digital input signal is converted to a value ($\pm\sqrt{2}$) of a QPSK modulation point and the value of a QPSK modulation point is converted to, for example, a six-bit digital signal. When the value of a QPSK modulation point is converted to a six-bit digital signal, the value after the conversion is an approximation, so that an error may occur. Multiplication by a tap coefficient may cause the error even greater. When the number of bits in each digital signal is increased to reduce the influence of error, the circuit size may become greater.

Figure 1A:
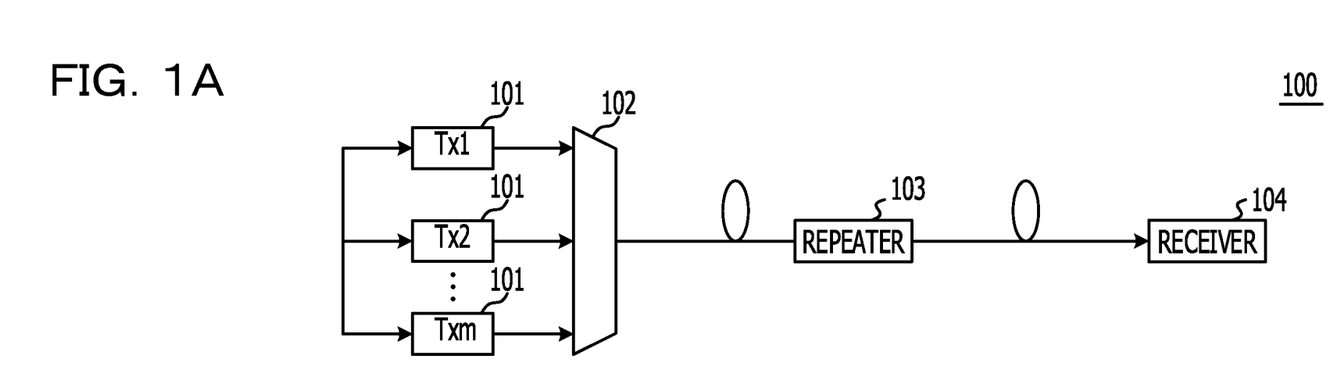
FIGS. 1A and 1B illustrate an example of a digital coherent optical transmission system.
Figure 1B:
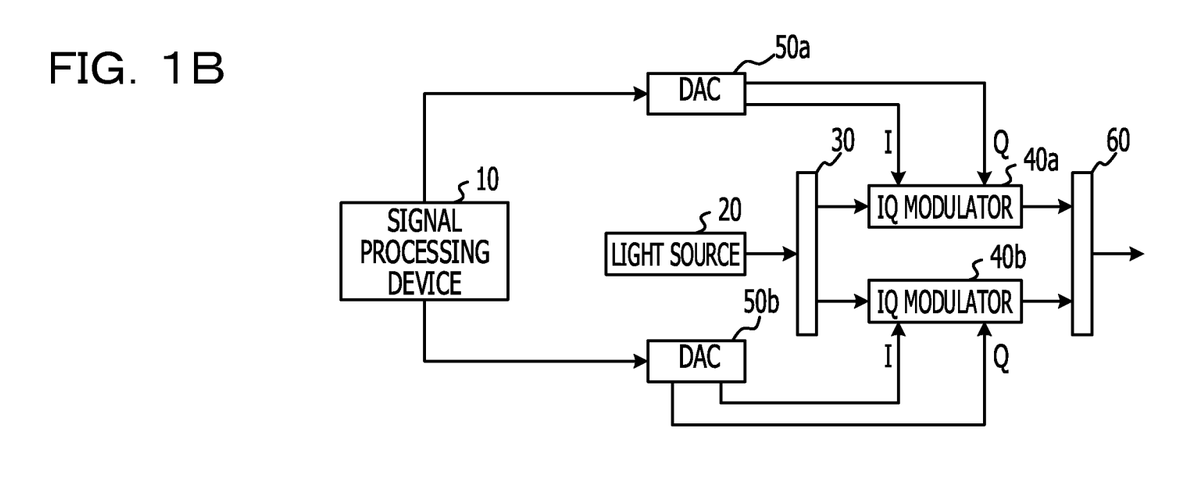

FIGS. 1A and 1B illustrate an example of a digital coherent optical transmission system. FIG. 1A illustrates a main part of an optical transmission system 100. FIG. 1B illustrates a transmitter of an optical transmission system 100. The optical transmission system 100 may be, for example, a wavelength division multiplexing (WDM) transmission system, and optical signals of m channels are multiplexed for transmission. An optical signal of each channel may have a different wavelength, respectively.

With reference to FIG. 1A, the optical transmission system 100 is provided with m number of transmitters 101 (Tx1 through Txm), a multiplexer 102, a repeater 103, and a receiver 104. With reference to FIG. 1B, each transmitter 101 includes a signal processing device 10, a light source 20, a branch 30, IQ modulators 40a and 40b, digital/analog converters (DAC) 50a and 50b, and a multiplexer 60.

The light source 20 outputs an optical signal having a peak at a particular wavelength, such as a semiconductor laser, to output an optical signal having a different wavelength in accordance with the channel. The branch 30 branches the optical signal from the light source 20 into an X polarization and a Y polarization perpendicular to each other, and may be a polarization beam splitter (PBS), for example.

The X polarization output from the branch 30 is input to the IQ modulator 40a, and the Y polarization output from the branch 30 is input to the IQ modulator 40b. The DAC 50a converts the driving signal (digital signal) from the signal processing device 10 to an analog signal of an in-phase (I) component and a quadrature (Q) component to input the analog signal to the IQ modulator 40a. The DAC 50b converts the driving signal from the signal processing device 10 to an analog signal of an I component and a Q component to supply the analog signal to the IQ modulator 40b. The I component of the driving signal for the X polarization may be referred to as an X-I component, and the Q component of the driving signal for the X polarization may be referred to as an X-Q component. The I component of the driving signal for the Y polarization may be referred to as a Y-I component, and the Q component of the driving signal for the Y polarization may be referred to as a Y-Q component.

The IQ modulator 40a may be a modulator to perform optical modulation in accordance with the analog signal from the DAC 50a, and outputs a first modulation signal. The IQ modulator 40b may be a modulator to perform optical modulation in accordance with the analog signal from the DAC 50b, and outputs a second modulation signal. The first modulation signal is transmitted utilizing the X polarization, and the second modulation signal is transmitted utilizing the Y polarization. The multiplexer 60 may be a device to polarization multiplex each polarization, and may also be a polarization beam combiner (PBC). The multiplexer 60 polarization multiplexes the first and second modulation signals for output as an optical signal of each channel.

The optical signal output from each transmitter 101 is multiplexed by the multiplexer 102 to be received by the receiver 104 through the repeater 103. Through the above process, the optical signal output by each transmitter 101 is transmitted.

Figure 2A:
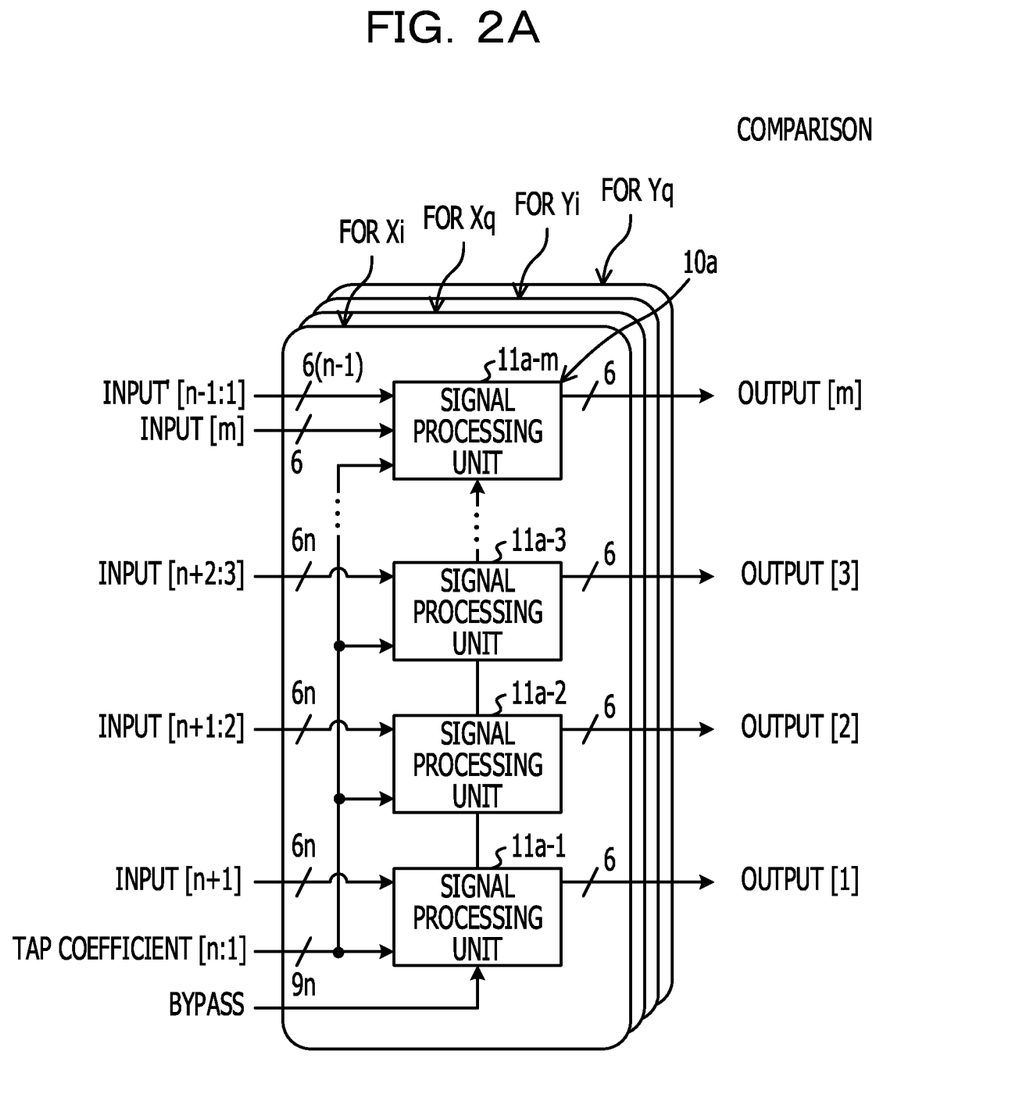
FIG. 2A illustrates an example of a signal processing device.

FIG. 2A illustrates an example of a signal processing device. In FIG. 2A, a signal processing device 10a includes signal processing units 11a for the X-I component, for the X-Q component, for the Y-I component, and for the Y-Q component corresponding to each channel. In FIG. 2A, reference characters corresponding to each channel are assigned. For example, reference characters of "11a-1" are assigned to the signal processing unit for the channel 1, and reference characters of "11a-m" are assigned to the signal processing unit for the channel m.

A tap coefficient [n:1] is input to each signal processing unit 11a. The notation [X:Y] denotes [X] through [Y]. The tap coefficient [n:1] denotes a tap coefficient [1] through a tap coefficient [n]. The notation "n" may be, for example, "21". Such a tap coefficient may be, for example, a tap coefficient of a nine-bit (one sign bit+eight data bits) finite impulse response (FIR) low-pass filter. The tap coefficient [n:1] may be 9×n bits.

A digital input signal [n:1] is further input to the signal processing unit 11a-1. An input signal [2] denotes a signal in a clock following an input signal [1]. An input signal [n+1:2] is further input to the signal processing unit 11a-2, and an input signal [m] and an input signal' [n−1:1] are input to the signal processing unit 11a-m. The notation "input signal" denotes an input signal of the previous time unit where an input signal [m:1] is one time unit. An input signal [k] (k=1 through n) may be, for example, six bits. An input signal input to each signal processing unit 11a may be 6×n bits.

Figure 2B:
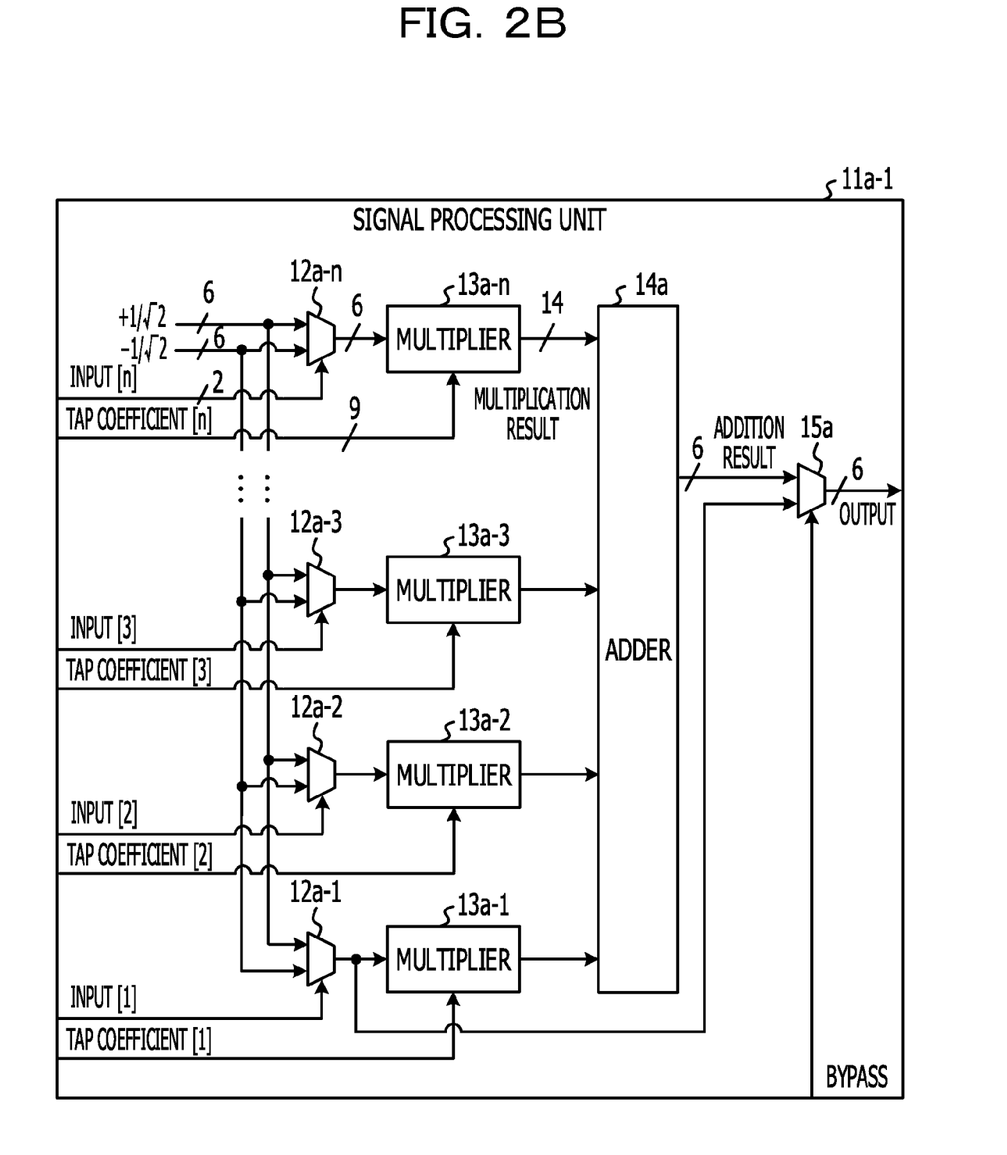
FIG. 2B illustrates an example of a signal processing unit.

FIG. 2B illustrates an example of such signal processing unit. For example, a signal processing unit illustrated in FIG. 2B may be the signal processing unit 11a-1. In FIG. 2B, the signal processing unit 11a-1 includes mappers 12a as many as the number of taps, multipliers 13a as many as the number of taps, an adder 14a, and a selector 15a. In FIG. 2B, reference characters are assigned corresponding to the tap coefficient. For example, reference characters of "12a-1" are assigned to the mapper 12a corresponding to the tap coefficient [1]. Reference characters of "12a-n" are assigned to the mapper 12a corresponding to the tap coefficient [n]. Reference characters of "13a-1" are assigned to the multiplier 13a corresponding to the tap coefficient [1]. Reference characters of "13a-n" are assigned to the multiplier 13a corresponding to the tap coefficient [n].

Mapping coefficients of $+1/\sqrt{2}$ and $-1/\sqrt{2}$ and the input signal [k] is input to the mapper 12a-k. Such mapping coefficient may be, for example, six bits. Such input signal [k] may be a two-bit PreCoder output. Two-bit×n number of PreCoder outputs is input to the signal processing unit 11a-1. The mapper 12a-k selects the mapping coefficient of $+1/\sqrt{2}$ or $-1/\sqrt{2}$, thereby QPSK mapping the input signal [k]. An output signal of the mapper 12a-k may be, for example, six bits.

The mapping result of the mapper 12a-k and a tap coefficient [k] are inputted to the multiplier 13a-k. The multiplier 13a-k outputs a multiplication result that is obtained by multiplying the mapping result of the mapper 12a-k by the tap coefficient [k]. The multiplication result may be, for example, 14 bits.

Multiplication results of the multipliers 13a-1 through 13a-n are input to the adder 14a. The adder 14a outputs a result that is obtained by adding the multiplication results of the multipliers 13a-1 through 13a-n. In the adder 14a, data with 14 bits+a bit width for the number of taps is obtained. For example, when the number of taps is 7, data with 14 bits+3 bits is obtained. When the number of taps is 9, data with 14 bits+4 bits is obtained. For example, the top six bits (one bit is a sign bit) in the obtained data are output as the addition result.

One bit of a bypass signal indicating whether or not to bypass the signal processing, an output signal of the mapper 12a-1, and the addition result of the adder 14a are input to the selector 15a. The selector 15a selects any of the mapping result of the mapper 12a-1 or the addition result of the adder 14a, based on the bypass signal, for output. The output of the selector 15a is output as an output signal of the signal processing unit 11a. The output signal of the signal processing unit 11a-1 may be, for example, an output signal [1], and the output signal of the signal processing unit 11a-m may be, for example, an output signal [m].

In the signal processing device 10a, an output signal [m:1] is obtained using the m number of signal processing units 11. The output signal [m:1] denotes the output signal [1] through the output signal [m]. An output signal for four channels (the X-I component, the X-Q component, the Y-I component, and the Y-Q component) is used, thereby achieving the QPSK mapping and the FIR low-pass filter.

Figure 3A:
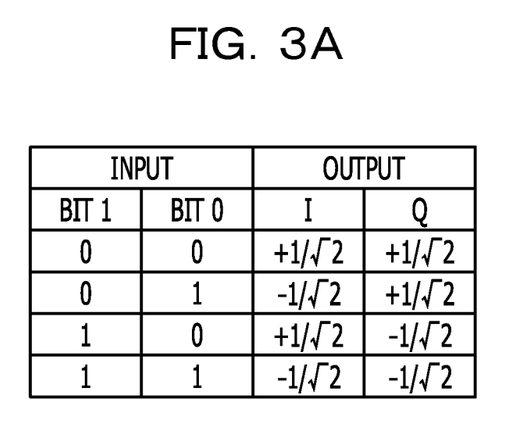
FIGS. 3A and 3B illustrate an example of mapping in a signal processing device.
Figure 3B:
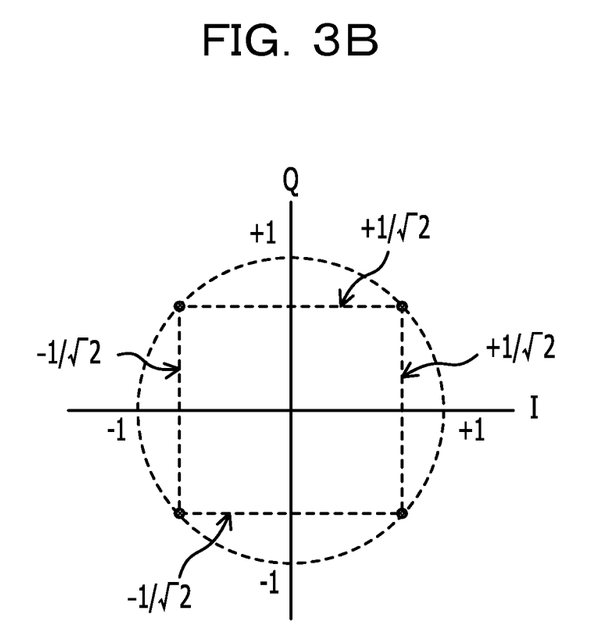

Consideration is given to a quantization error in the signal processing device 10a. FIGS. 3A and 3B illustrate an example of mapping in a signal processing device. When a digital input signal is converted to a value of a QPSK modulation point, it is converted to a value of coordinates of a combination of $+1/\sqrt{2}$ and $-1/\sqrt{2}$. For example, $+1/\sqrt{2}$ is 0.7071067811 . . . . The fractional part of this value is expressed as 0.10110 in binary five-bit representation excluding one sign bit. This value becomes 0.6875 back in decimal, thereby the quantization error becoming −0.0196067811 . . . . When the tap coefficient is 0.33333333 . . . , the tap coefficient is expressed as 0.3125 through similar process. Therefore, the quantization error becomes −0.02083333 . . . .

When a quantization error is taken into consideration, the multiplication result of "0.6875" input to the multiplier x the tap coefficient "0.3125" becomes 0.21484375. When a quantization error is not taken into consideration, the multiplication result of "0.70710678" input to the multiplier x the tap coefficient "0.33333333" becomes 0.23570226. Therefore, the error, which is a difference between "0.21484375" and "0.23570226", becomes −0.2085851 . . . .

For example, an input bit may be six bits (including one sign bit), a number of taps may be 21, and a tap coefficient may be nine bits (including one sign bit). In this case, the input error becomes $1/2^5/2=1.563\%$, the tap coefficient error becomes $1/2^8/2=0.391\%$, the multiplier error becomes 1.563+0.391=1.954%, and the adder error becomes 1.954× 11=21.494%. The number "11" to be multiplied for the adder error may be a value with an assumption that taps for a real number are 11 taps as approximately half. In such a manner, a quantization error of six-bit data generated in the mapper 12a may be increased by being multiplied by a tap coefficient in the multiplier 13a and by being added in the adder 14a.

Reduction of error may cause an increase in the bit width for the entire signal processing units including the multipliers or the adder and the input error, the tap coefficient error, and the like. Therefore, the circuit size may become greater.

Figure 4:
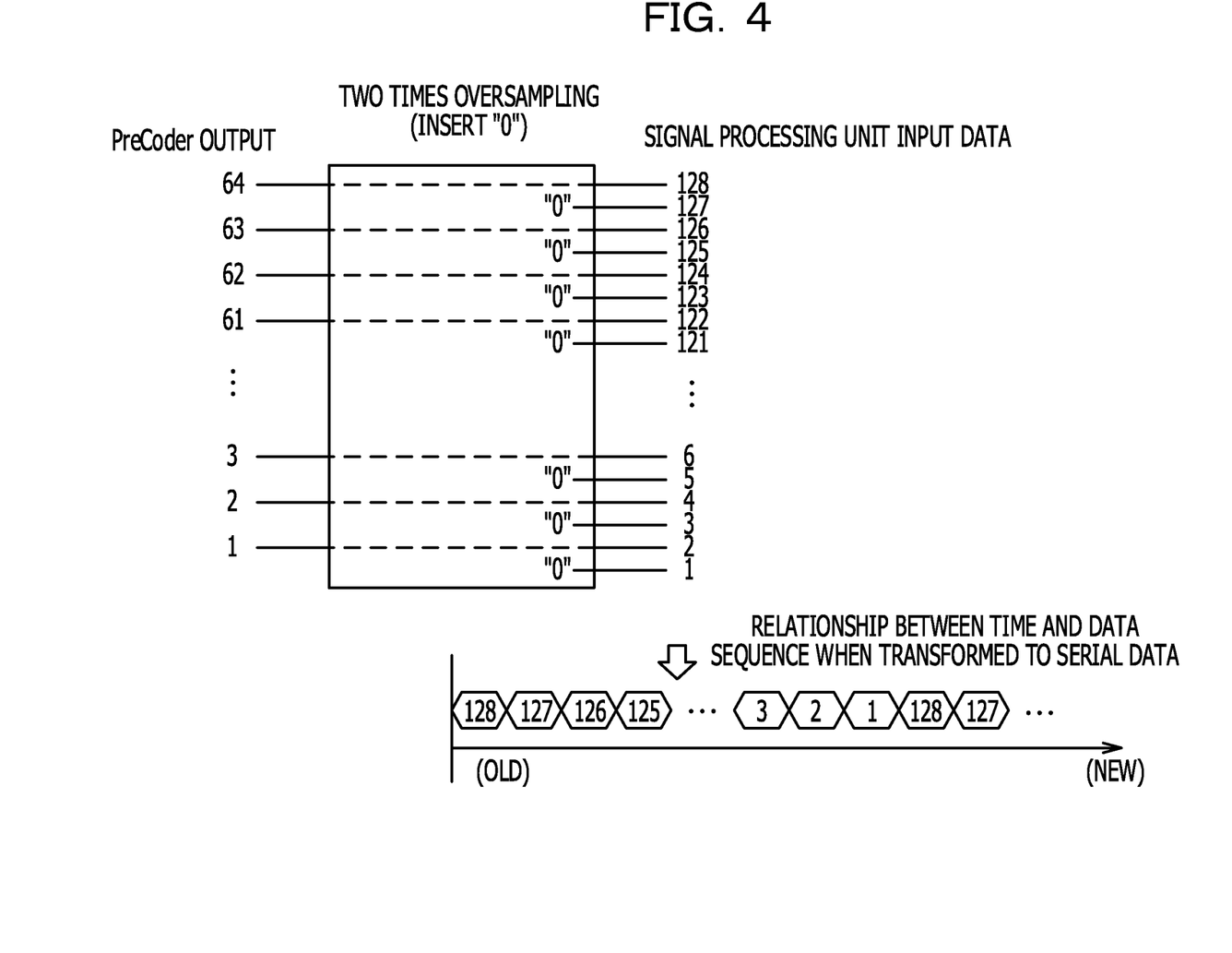
FIG. 4 illustrates an example of an input signal.

FIG. 4 illustrates an example of an input signal. For example, m may be 128. The input signal may be a two-bit PreCoder output. Two times oversampling may be employed, and "0" is inserted as an odd input signal. When the input signal [m:1] is transformed to serial data, the data may be sorted from larger numbers to smaller numbers.

Figure 5A:
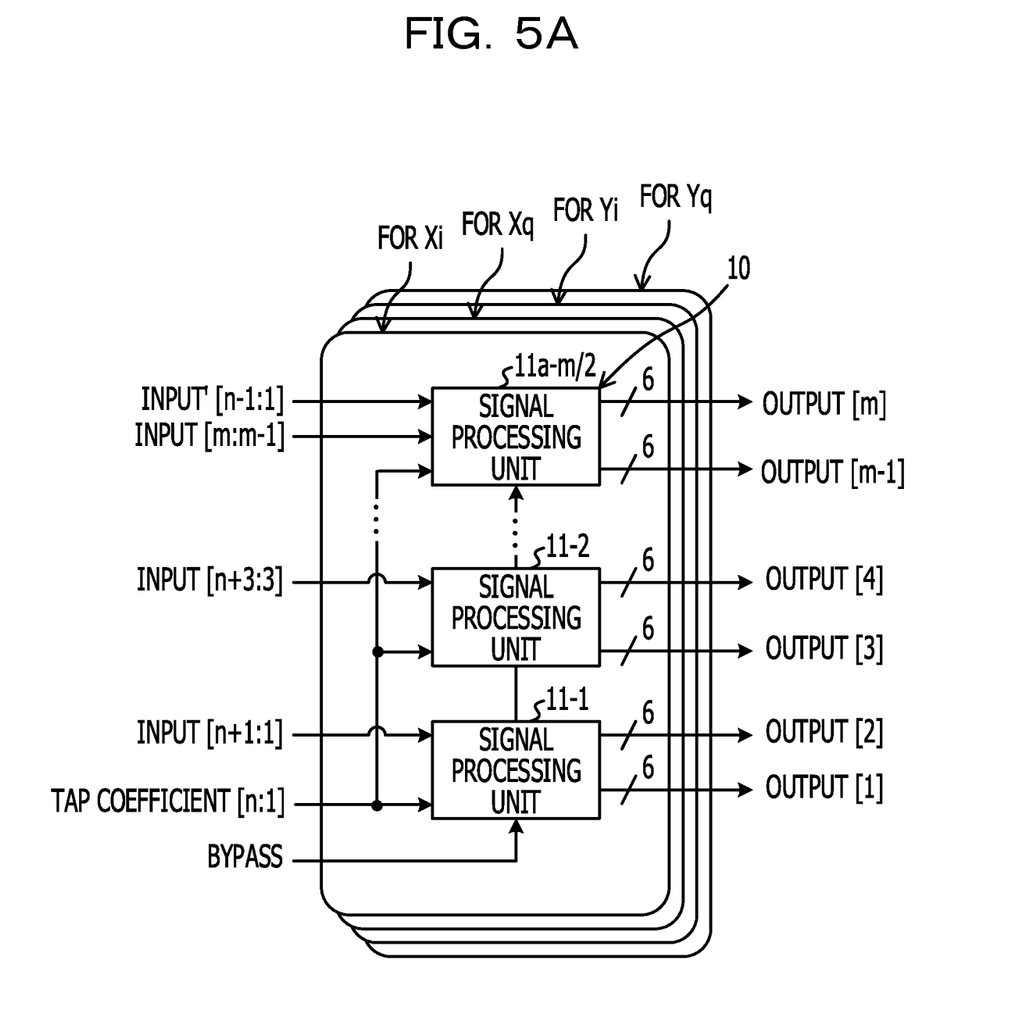
FIG. 5A illustrates an example of a signal processing device.

FIG. 5A illustrates an example of a signal processing device. In FIG. 5A, the signal processing device 10 includes the signal processing units 11 for the X-I component, for the X-Q component, for the Y-I component, and for the Y-Q component corresponding to each channel. In FIG. 5A, reference characters are assigned corresponding to each channel. For example, reference characters of "11-1" are assigned to the signal processing unit for the channel 1. Since each signal processing unit outputs two output signals, reference characters of "11-m/2" are assigned to the signal processing unit for the channel m.

The tap coefficient [n:1] is input to each signal processing unit 11. Such a tap coefficient may be, for example, a tap coefficient of a nine-bit (one sign bit+eight data bits) finite impulse response (FIR) low-pass filter. For example, the tap coefficient [n:1] may be 9×n bits. A digital input signal [n+1:1] is input to the signal processing unit 11-1, an input signal [n+3:3] is input to the signal processing unit 11-2, and an input signal [m:m−1] and an input signal' [n−1:1] are input to the signal processing unit 11-$m$/2. The notation "input signal" denotes an input signal of the previous time unit where an input signal [m:1] is one time unit. An input signal input to each signal processing unit 11 may be 6×(n+1) bits.

Figure 5B:
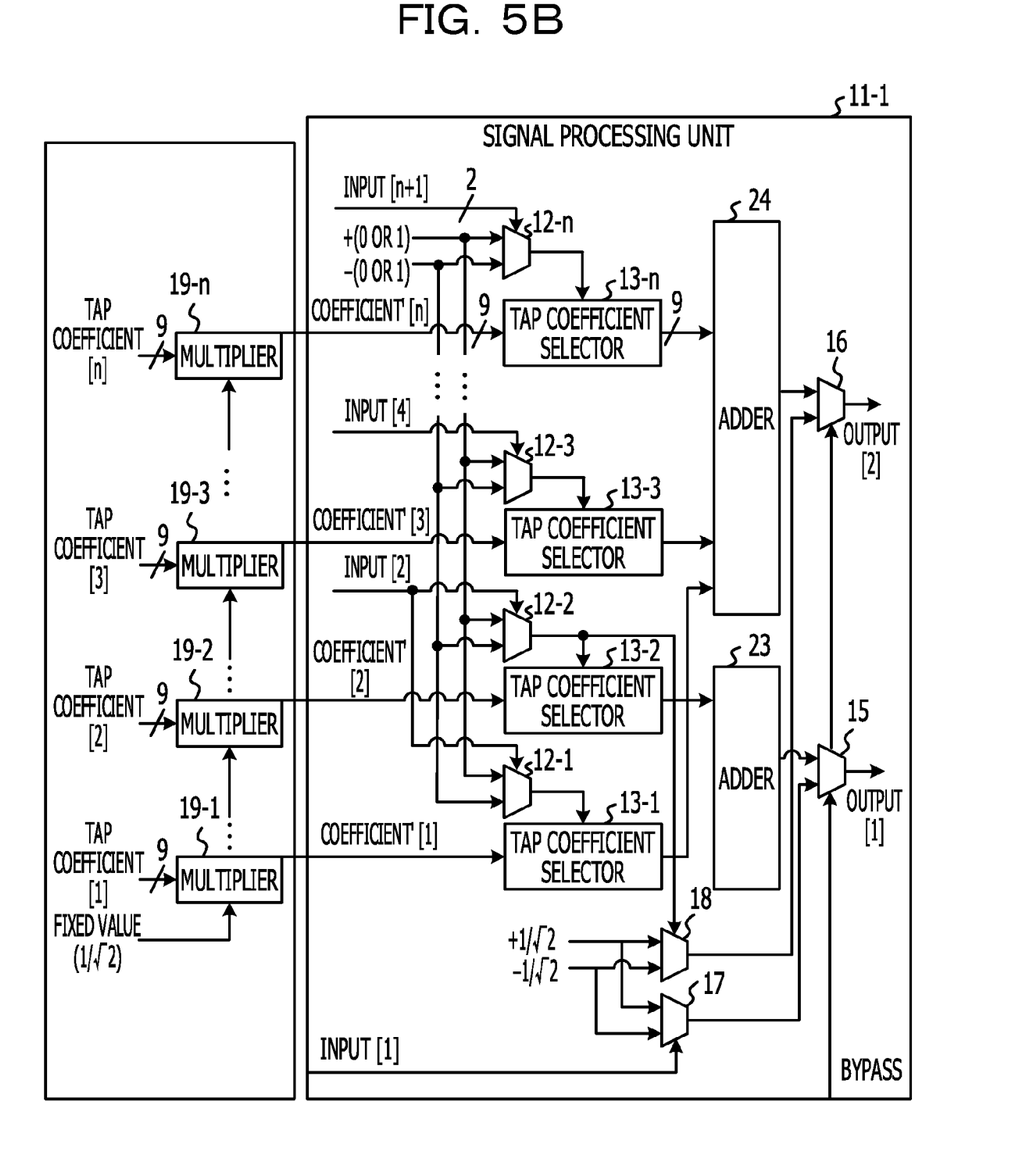
FIG. 5B illustrates an example of a signal processing unit.

FIG. 5B illustrates an example of a signal processing unit. The signal processing unit illustrated in FIG. 5B may correspond to the signal processing unit 11-1. In FIG. 5B, the signal processing unit 11-1 includes mappers 12 as many as the number of taps, tap coefficient selectors 13 as many as the number of taps, adders 23 and 24, and selectors 15 through 18. Multipliers 19 may be arranged as many as the number of taps. The multipliers 19 may be arranged inside the signal processing unit 11 and may also be arranged outside. In FIG. 5B, reference characters are assigned corresponding to the tap coefficient. For example, reference characters of "12-1" are assigned to the mapper 12 corresponding to the tap coefficient [1]. Reference characters of "12-$n$" are assigned to the mapper 12 corresponding to the tap coefficient [n]. Reference characters of "13-1" are assigned to the tap coefficient selector 13 corresponding to the tap coefficient [1]. Reference characters of "13-$n$" are assigned to the tap coefficient selector 13 corresponding to the tap coefficient [n]. Reference characters of "19-1" are assigned to the multiplier 19 corresponding to the tap coefficient [1]. Reference characters of "19-$n$" are assigned to the multiplier 19 corresponding to the tap coefficient [n].

One-bit data of 0 or +1 and one-bit data of −1 or 0 are input to each mapper 12. For example, to each mapper 12, data representing positive or negative is input as a mapping coefficient. Odd input signals other than the input signal [1] may not be input to the mappers 12. The input signal [2] is input to the mapper 12-1 and the mapper 12-2. The input signal [4] is input to the mapper 12-3 and the mapper 12-4. Similarly, an even input signal is input to each mapper. The input signal [n+1] may be input only to the mapper 12-$n$. The input signal [1] is input to the selector 17.

Each mapper 12 selects one of the one-bit signal of 0 or +1 and the one-bit signal of −1 or 0, thereby pseudo-QPSK mapping the input signal. The mapping result by the mapper 12 is input to the tap coefficient selector 13. The multiplier 19 multiplies the nine-bit tap coefficient by $1/\sqrt{2}$. The multiplication result that is obtained by the multiplier 19 is input to the tap coefficient selector 13 as a tap coefficient'. The mapping result of the mapper 12-2 is also input to the selector 18.

Figure 5C:
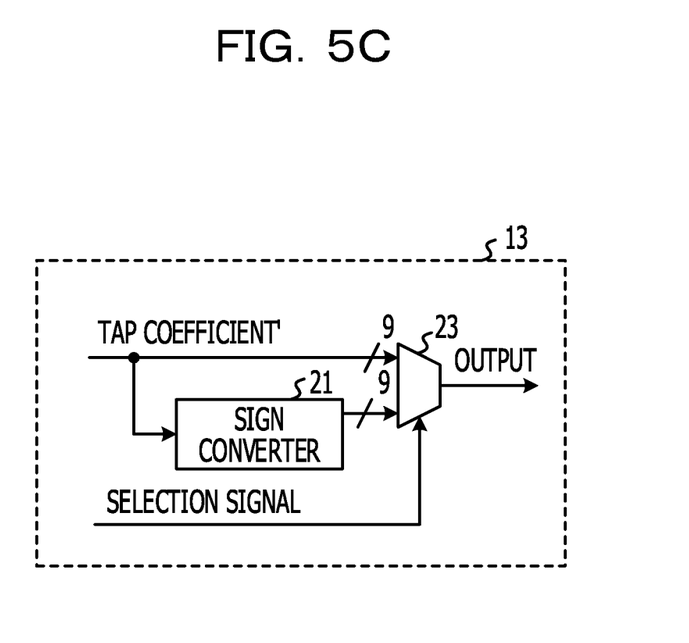
FIG. 5C illustrates an example of a tap coefficient selector.

FIG. 5C illustrates an example of a tap coefficient selector. In FIG. 5C, the tap coefficient selector 13 includes a sign converter 21 and a selector 22. The sign converter 21 converts the sign of the tap coefficient'. The tap coefficient', the tap coefficient' with a sign converted by the sign converter 21, and a selection signal are input to the selector 22. The selection signal may be the mapping result that is output by the mapper 12. The tap coefficient selector 13 selects the tap coefficient' or the tap coefficient' with a converted sign, based on the selection signal, for output.

Selection results by even tap coefficient selectors 13 are input to the adder 23. The adder 23 outputs a total of the selection results by the even tap coefficient selectors 13 to the selector 15 as an output [1]. Selection results by the odd tap coefficient selectors 13 are input to the adder 24. The adder 24 outputs a total of the selection results by the odd tap coefficient selectors 13 to the selector 16 as an output [2].

In the adders 23 and 24, data with nine bits+a bit width for the approximately half number of taps is obtained. For example, when the number of taps is 7, the output [1] becomes nine bits+two bits and the output [2] becomes nine bits+three bits. For example, when the number of taps is 9, the output [1] becomes nine bits+three bits and the output [2] becomes nine bits+four bits. The top six bits (one bit is a sign bit) in these types of data may be output as the addition result.

Six-bit mapping coefficients of $+1/\sqrt{2}$ and $-1/\sqrt{2}$ are inputted and also the input signal [1] is input to the selector 17. The selector 17 selects any of $+1/\sqrt{2}$ and $-1/\sqrt{2}$ based on the input signal [1] to input the coefficient to the selector 15. Six-bit mapping coefficients of $+1/\sqrt{2}$ and $-1/\sqrt{2}$ and the mapping result of the mapper 12-2 are input to the selector 18. The selector 18 selects any of $+1/\sqrt{2}$ and $-1/\sqrt{2}$ based on the mapping result of the mapper 12-2 to input the coefficient to the selector 16.

The selector 15 outputs the output [1] input from the adder 23 or a signal input from the selector 17 as the output signal [1] based on a one-bit bypass signal indicating whether or not to bypass the signal processing. The selector 16 outputs the output [2] input from the adder 24 or a signal input from the selector 18 as an output signal [2] based on the bypass signal.

Figure 6:
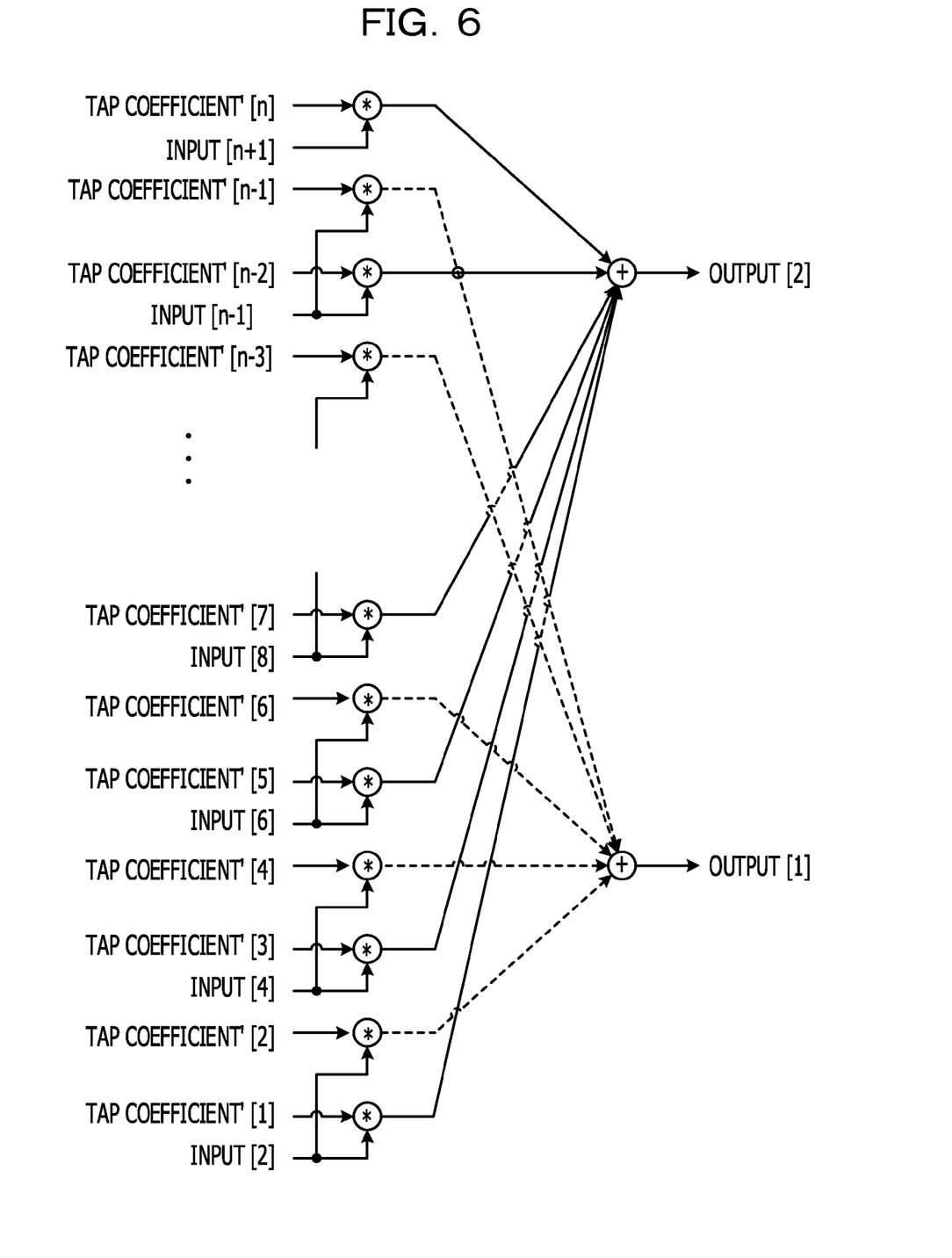
FIG. 6 illustrates an example of signal processing.

FIG. 6 illustrates an example of signal processing. The signal processing illustrated in FIG. 6 may be executed by the signal processing unit 11-1. In FIG. 6, a multiplication result of the input signal [2] and a tap coefficient' [1] is output to the adder 24. A multiplication result of the input signal [2] and a tap coefficient' [2] is supplied to the adder 23. Similarly, a multiplication result of an input signal [n−1] and a tap coefficient' [n−2] is supplied to the adder 24. A multiplication result of the input signal [n−1] and a tap coefficient' [n−1] is supplied to the adder 23. A multiplication result of the input signal [n+1] and a tap coefficient' [n] is supplied to the adder 23. In FIGS. 5A through 5C, the tap coefficient selectors may have a function substantially the same as the multiplication of an input signal and a tap coefficient.

In the signal processing device 10, the output signal [m:1] is obtained using an m/2 number of signal processing units 11. The output signal [m:1] denotes the output signal [1] through the output signal [m]. An output signal for four channels (the X-I component, the X-Q component, the Y-I component, and the Y-Q component) is used, thereby achieving the QPSK mapping and the FIR low-pass filter.

For example, a digital input signal without being converted to a value ($\pm 1/\sqrt{2}$) of a QPSK modulation point may be multiplied by a $1/\sqrt{2}$ tap coefficient remaining. Therefore, a quantization error of the multipliers may be reduced or removed. The mappers 12 and the tap coefficient selectors 13 are used by generating a one-bit control signal. Therefore, the factor of an increase in the quantization error may be the adder 14 only. The influence of error may be reduced while the number of bits is reduced.

For example, the input bit may be six bits (including one sign bit), the number of taps may be 21, and the tap coefficient may be nine bits (including one sign bit). In this case, the input error may be 0%, the tap coefficient error may be $1/2^8/2=0.391\%$, the error in the tap coefficient selector may be $1/2^8/2=0.391\%$, and the adder error may be 0.391×11=4.301%. The number "11" to be multiplied for the adder error may be a value with an assumption that taps for a real number are 11 taps as approximately half. An increase in the error may be suppressed and, for example, the error may be reduced to approximately ⅓ compared with FIGS. 2A and 2B. In order to improve the precision, the bit width for the tap coefficient selectors and the adders may also be increased. Since the bit width for the multipliers is not increased, the influence of an increase in the bit width may be reduced.

An input signal is mapped (normalized) to a point of the amplitude |1|, and a tap coefficient of a filter that is stored by multiplying by a fixed value in advance is reversed in polarity in accordance with the mapping output to be sent to an adder. Therefore, memory capacity to store a tap coefficient may be the number of taps×nine bits. The memory capacity may not depend on the number of parallel input signals or the modulation scheme.

An input signal is mapped to a point of the amplitude |1|, and the mapping output is used for determination of whether or not the tap coefficient has to be reversed in polarity. Only the mapping output may also be used. Therefore, phase information and a counted number may not be used. A tap coefficient obtained by multiplying filter characteristics that a user wishes to obtain by a fixed value ($1/\sqrt{2}$) is maintained, so that the result of operation may not be read out from the memory based on an address.

The multipliers 19 may function as a multiplier to obtain a mapping coefficient by multiplying a tap coefficient by $1/\sqrt{2}$. The tap coefficient selectors 13 may function as a converter to convert the input signal to a value of a QPSK modulation point by multiplying the mapping coefficient by a digital input signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing device comprising:
    a plurality of multipliers configured to obtain respective second tap coefficients by multiplying respective first tap coefficients by a first value;
    a plurality of mappers configured to output respective mapping results based on signals and respective digital input signals; and
    a plurality of first coefficient selectors configured to select the respective second tap coefficients based on the respective mapping results.

2. The signal processing device according to claim 1, wherein each of the plurality of first coefficient selectors includes:
    a converter configured to convert a sign of the respective second tap coefficients and output a converted result as respective third tap coefficients; and
    a second coefficient selector configured to select one of the respective second tap coefficients and the respective third tap coefficients based on the respective mapping results.

3. The signal processing device according to claim 1, wherein each of the plurality of mappers selects one of the signals based on the respective digital input signals and output a selected result as the respective mapping results.

4. The signal processing device according to claim 1, further comprising:
    an adder configured to add outputs of the plurality of first coefficient selectors.

5. The signal processing device according to claim 4, wherein the adder includes:
    a first adder configured to add outputs from a first group of the plurality of first coefficient selectors and output an addition result as a first addition result; and
    a second adder configured to add outputs from a second group of the plurality of first coefficient selectors and output an addition result as a second addition result.

6. The signal processing device according to claim 4, further comprising:
    a first selector configured to select one of a second value and the output of the adder based on a bypass signal.

7. The signal processing device according to claim 6, further comprising:
    a second selector configured to select one of the first value and a third value obtained by adding a negative sign to the first value and supply a selected result to the first selector as the second value.

8. The signal processing device according to claim 7, wherein the second selector selects one of the first value and the third value based on an output from one of the plurality of mappers.

9. The signal processing device according to claim 1, wherein the first value is $1/\sqrt{2}$.

10. A signal processing method, comprising:
    obtaining respective second tap coefficients by multiplying respective first tap coefficients by a first value;
    performing a mapping operation based on signals and respective digital input signals to output respective mapping results; and
    selecting, by a plurality of first coefficient selectors, the respective second tap coefficients based on the respective mapping results.

11. The signal processing method according to claim 10, further comprising:
    converting a sign of the respective second tap coefficients to output a converted result as respective third tap coefficients; and
    selecting, by a plurality of second coefficient selectors, one of the respective second tap coefficients and the respective third tap coefficients based on the respective mapping results.

12. The signal processing method according to claim 10, further comprising:
    selecting one of the signals based on the respective digital input signals to output a selected result as the respective mapping results.

13. The signal processing method according to claim 10, further comprising:
    adding outputs of the plurality of first coefficient selectors.

14. The signal processing method according to claim 10, wherein the first value is $1/\sqrt{2}$.

15. A communication device, comprising:
    a signal processing device configured to process an input signal;
    a digital/analog converter configured to convert an output of the signal processing device to an analog signal; and
    a modulator configured to perform modulation on the analog signal,
    wherein the signal processing device includes:
    a plurality of multipliers configured to obtain respective second tap coefficients by multiplying respective first tap coefficients by a first value;
    a plurality of mappers configured to output respective mapping results based on signals and respective digital input signals; and a plurality of first coefficient selectors configured to select the respective second tap coefficients based on the respective mapping results.

16. The communication device according to claim 15, wherein each of the plurality of first coefficient selectors includes:
a converter configured to convert a sign of the respective second tap coefficients and output a converted result as respective third tap coefficients; and
a second coefficient selector configured to select one of the respective second tap coefficients and the respective third tap coefficients based on the respective mapping results.

17. The communication device according to claim 15, wherein each of the plurality of mappers selects one of the signals based on the respective digital input signals and output a selected result as the respective mapping results.

18. The communication device according to claim 15, further comprising:
an adder configured to add outputs of the plurality of first coefficient selectors.

19. The communication device according to claim 15, wherein the first value is $1/\sqrt{2}$.

* * * * *